Jan. 17, 1967     H. G. EMPSON     3,298,173
EXPANDABLE LINK
Filed Aug. 11, 1964
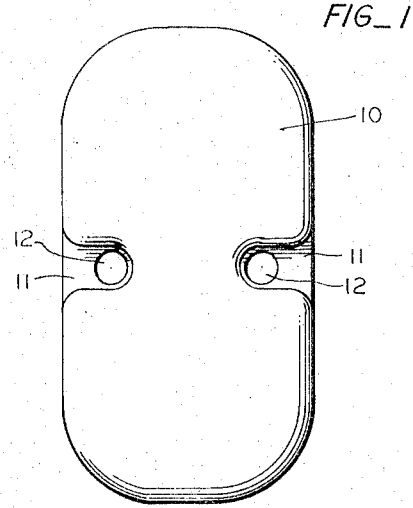
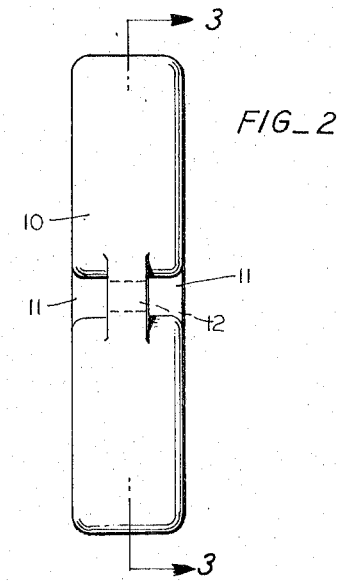
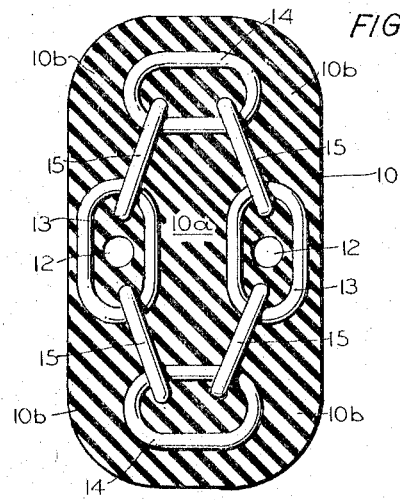
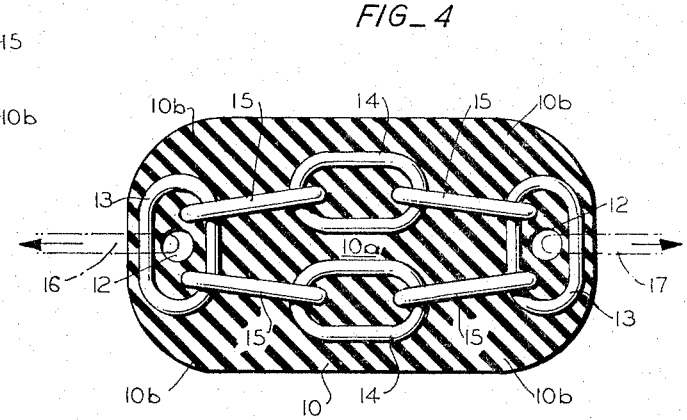
INVENTOR.
HERBERT G. EMPSON
BY *Allen and Chrony*
ATTORNEYS United States Patent Office 3,298,173
Patented Jan. 17, 1967

3,298,173
EXPANDABLE LINK
Herbert George Empson, 17165 Buena Vista Ave.,
Los Gatos, Calif. 95030
Filed Aug. 11, 1964, Ser. No. 388,896
3 Claims. (Cl. 59—78)

This invention relates to a resilient, elastic link for use in tie-down chains, ropes and the like.

An object of this invention is to provide an improved resilient, elastic link for use with tie-down hooks to absorb shock and prevent the hooks attached to automobiles and other apparatus from being torn therefrom by shock during transit.

Another object of this invention is to provide an improved resilient, elastic link for use with tie-down hooks to absorb shock, said elastic link being provided with a body made of resilient, elastic material having embedded therein a short length of chain in a preoriented position which is in its non-extended condition when said body is in its non-distorted condition, said body also being provided with opposed apertures extending through links to the embedded chain whereby said body may be attached to the tie-down hooks and the elastic body will stretch to the extent permitted by the embedded chain when subjected to shock and thus preventing said tie-down hooks from being torn out of the apparatus anchored thereby.

Other and further objects of this invention will be apparent to those skilled in the art to which it relates from the following specification, claims and drawing in which, briefly:

FIG. 1 is a plan view of one of the elastic links embodying this invention;

FIG. 2 is a side view of the link shown in FIG. 1;

FIG. 3 is a sectional view of the elastic link of this invention showing the chain embedded therein in its non-extended condition; and FIG. 4 is a sectional view of the link showing the elastic body member distorted to the extent permitted by the embedded chain when the link is in the process of absorbing shock to which the tie-down hooks are subjected, thus preventing the hooks from being torn out of automobiles and other apparatus during transit on flat cars or in box cars.

Referring to the drawing in detail, reference numeral 10 designates the body of the link, which may be made of elastic material such as rubber and which is readily molded in a suitable die. This body member is made of generally rectangular shape as shown, and each of the long sides thereof is provided with opposing recesses 11, as shown in FIGS. 1 and 2. The holes 12 open into the recesses 11 so that suitable hooks or other attaching means may be inserted into these holes 12. The elastic link is thus attached to the tie-down hooks, rope or chain used for bracing or attaching automobiles, boxes, machines or the like on railway flat cars or in box cars and functions to prevent the tie-down means from being torn out of these objects by shock during transit.

A chain comprising the links 13, 14 and 15, which has a tensile strength of 6000 pounds, for example, is embedded in the body 10 during the molding of this body so that the links are disposed therein substantially as shown in the sectional view of FIG. 2 when the elastic body 10 is in its non-distorted condition. Thus, the links 13 are positioned in the end parts of the body, while links 15 are used for joining links 13 and 14.

When the body 10 is subjected to shock which is transmitted to it by the tie-down means 16 and 17 shown in FIG. 4, which are hooked into the apertures 12 of the body member, the body 10 is distorted substantially to the shape shown in FIG. 4 since it is made out of resilient or elastic material, such as rubber. Both of the end parts 10b around the links 14 and the central part 10a will stretch when the body is subjected to shock. Also, the chain links 13, 14 and 15 will assume the position shown in FIG. 4, which shows the device subjected to a shock of, for example, 2000 pounds, transmitted to it from the tie-down means 16 and 17. Thus, this device, by absorbing shock from the tie-down means, prevents the hooks holding the automobiles or other equipment from being torn therefrom during shock. Different embodiments of this device may be constructed to absorb shocks of different intensities. Thus, different sizes of shock absorbing links may be used with different size loads. Also, more than one link may be used either in series or in parallel in the tie-down cable.

While I have shown a preferred embodiment of this invention it will be understood that the invention is capable of variation and modification from the form shown so that its scope should be limited only by the scope of the claims appended hereto.

What I claim is:

1. A shock absorbing link for use in tie-down means for securing cargo such as automobiles and the like during transit, comprising the combination of a resilient body member of elongated configuration, an endless chain having a plurality of metal links embedded in said body member, said chain being embedded in an extended condition in a direction corresponding substantially to the axial direction of the elongated configuration of said body member, said body member having opposed apertures in the long sides thereof for receiving attaching means of tie-down means used to secure various cargo during transit, spaced links of said chain being embedded in said body with said apertures passing therethrough so that said attaching means is adapted to be inserted through said spaced links whereby said chain is extended in a direction substantially perpendicular to said first direction under restraint of said resilient body when said body is absorbing shock to which said tie-down means is subjected so that said tie-down means is not torn from the machines secured thereby during transit.

2. A shock absorbing link for use in tie-down means for securing cargo such as automobiles and the like during transit, comprising the combination of a resilient body member of generally rectangular configuration, a plurality of metal links of a chain embedded in said body member, at least part of said embedded links normally forming a U-shaped loop, said body member having opposed apertures in the long sides of its generally rectangular configuration for receiving attaching means of tie-down means, spaced links of said U-shaped loop being embedded in said body with said apertures passing therethrough so that said attaching means is adapted to be inserted through said spaced links whereby U-shaped loop of said chain is extended under restraint of said resilient body member when the latter is stretched by shock to which said tie-down means is subjected.

3. A shock absorbing link for use in tie-down means for securing cargo such as automobiles and the like during transit, comprising the combination of a resilient body member of normally elongated configuration, said body member having opposed apertures in the midportions of the long sides thereof for receiving attaching means of tie-down means used to secure various cargo during transit, a chain embedded in said resilient body member with said apertures passing through spaced links thereof, said chain normally forming a loop extending into at least one end portion of said resilient body member from said apertures in said mid-portions, said chain being adapted to be extended from its normally looped configuration under restraint of said resilient body member when said body member is absorbing shock to which said tie-down means is subjected during transit of the cargo.

References Cited by the Examiner

UNITED STATES PATENTS

| 1,779,663 | 10/1930 | Cowell | 267—69 |
| 2,080,627 | 5/1937 | Morgan | 59—78 |
| 2,110,226 | 3/1938 | Hill | 59—78 |
| 2,192,946 | 3/1940 | Towner | 59—84 |

RICHARD J. HERBST, *Primary Examiner.*

G. P. CROSBY, *Assistant Examiner.*